No. 828,127. PATENTED AUG. 7, 1906.
T. E. LAMBERT.
AXLE AND WHEEL.
APPLICATION FILED DEC. 7, 1905.
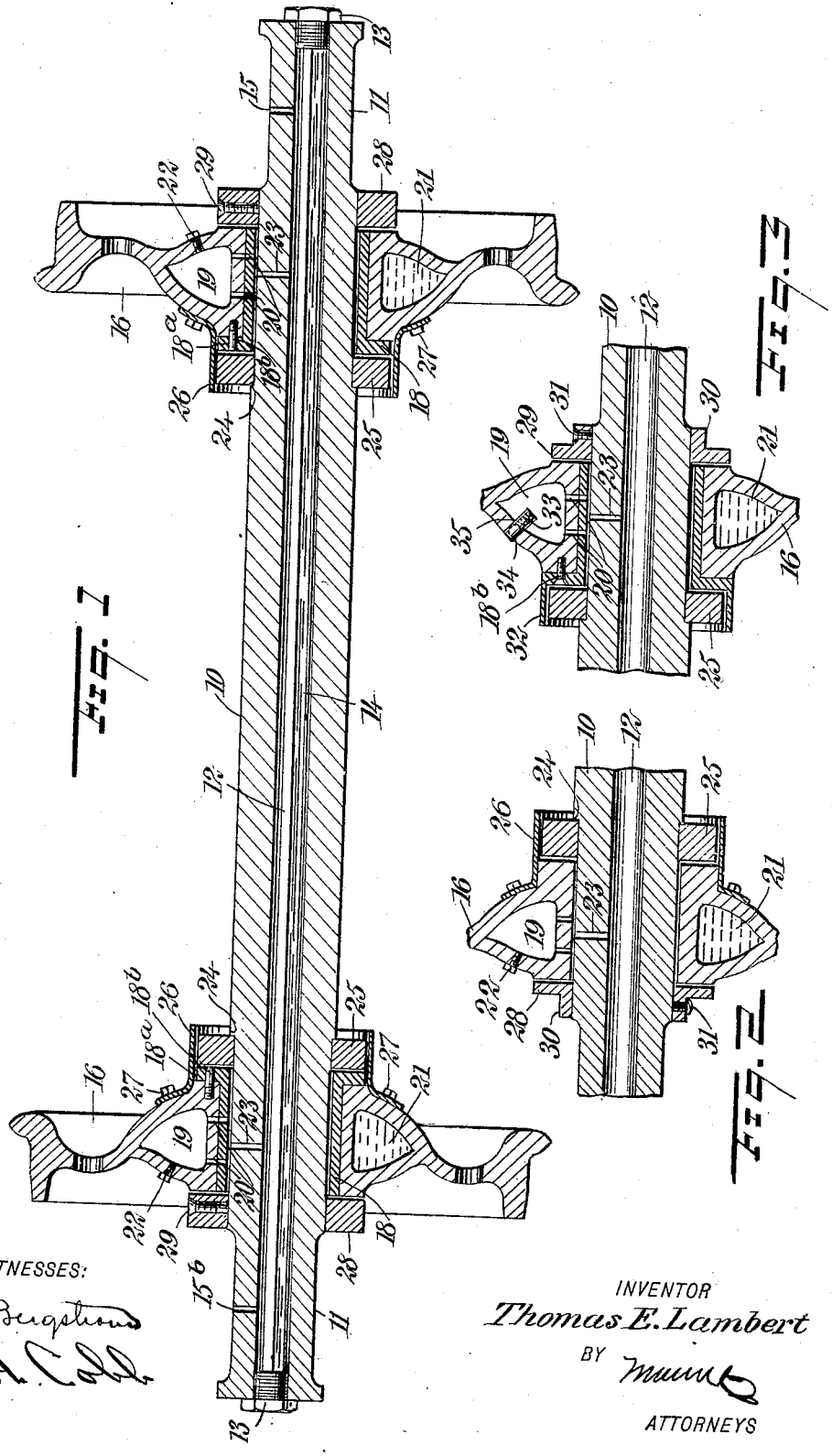
WITNESSES:
INVENTOR
*Thomas E. Lambert*
BY
ATTORNEYS

UNITED STATES PATENT OFFICE.

THOMAS EDWARD LAMBERT, OF BUTTE, MONTANA.

AXLE AND WHEEL.

No. 828,127.  Specification of Letters Patent.  Patented Aug. 7, 1906.

Application filed December 7, 1905. Serial No. 290,812.

*To all whom it may concern:*

Be it known that I, THOMAS EDWARD LAMBERT, a citizen of the United States, and a resident of Butte, in the county of Silverbow and State of Montana, have invented a new and Improved Axle and Wheel, of which the following is a full, clear, and exact description.

My invention relates to axles and wheels, and more particularly to those adapted for use upon cars. Its principal objects are to improve such devices both as to their lubrication and their general construction and to provide means for eliminating the friction of the wheels upon the track arising from slipping upon curves or from differences in the diameter of said wheels.

Reference is to be had to the accompanying drawings, forming a part of this specification, in which similar characters of reference indicate corresponding parts in all the figures.

Figure 1 is a central longitudinal section showing one embodiment of my invention, and Figs. 2 and 3 are sectional details of a portion of the axle and a coöperating wheel.

10 designates an axle having near its opposite extremities reduced portions 11 11, adapted to be received by suitable boxes in a truck and to rotate therein. This axle is shown as hollow, furnishing a chamber 12, the openings into which may be closed by screw-plugs 13. The chamber furnishes a receiver for a lubricant, (indicated by 14,) which may flow through passages 15 to the bearing of the axle. Adjacent to the reduced portions the axle has mounted to rotate about it wheels 16 16, which, as illustrated, are provided with interposed bushings 18, having at their inner ends flanges 18ª, contacting with the wheels. They may be compelled to rotate with the wheels by dowel-pins 18ᵇ. Although these bushings may increase the initial cost of the wheels, they are readily renewed when worn and also permit of the axle being turned up when desired. If at the same time the rim of the wheel is made comparatively thick, so that it may also be dressed off, the life of the organization is greatly increased. About each wheel, adjacent to the central bore, is a chamber 19, from which passages 20 of any suitable number and size lead to the bearing of the wheel upon the axle. A lubricant (indicated at 21) may be supplied to the wheel-chambers through openings normally closed by plugs 22. As an auxiliary to the lubrication from the wheel a passage 23 may lead from the chamber within the axle to each wheel-bearing. The character of the lubricant 14 may be such that at normal temperatures of the wheel-bearing it is too thick to flow through the passages; but if the supply from the wheels fails the heat generated will liquefy it, so that it will pass to the bearings. At the inner side of each wheel the axle is shouldered at 24, and against these shoulders rest collars 25, fast upon the axle, they being conveniently shrunk thereon and serving to take the inward thrust of the wheels. Over each collar projects an annular shield 26, preferably carried by the wheels, they being secured thereto by screws 27. Their purpose is to exclude dirt from the bearings of the wheels upon the axle. At the opposite or outer side of each wheel is a collar 28, which may be either secured to the shaft or loose thereon. In the former instance a screw 29 may be provided, countersunk in the collar and bearing against the axle. These collars may be of various thicknesses and space the wheels from the axle-bearings.

Although car-wheels are beveled to prevent their slipping upon curves, the differences in diameter secured may not be sufficient to compensate for the difference in speed of rotation, and in the usual organization of axle and wheel the one of the latter which is at the outer side of the curve must necessarily slip, producing great friction. The wheels are also liable to wear unequally in use, and this variation in diameter also introduces slipping and resulting friction; but with my improved arrangement it will be seen that this slipping is obviated, the wheel which tends to run faster turning freely upon the axle. At the same time the device is very perfectly lubricated, and even if the supply within both the wheel-chambers and axle-boxes fails they will still be supplied by the contents of the hollow axle.

If desirable, the bushing may be omitted and the wheel mounted directly upon the axle, as illustrated in Fig. 2 of the drawings. This wheel is somewhat less expensive and may be used for lighter work. Here the collar 28 is shown as being comparatively thin, and projecting from its outer side is a hub or flange 30 to receive a screw 31, fixing it to the axle.

In Fig. 3 instead of the shield 26, secured to the wheel, its equivalent is provided by a flange 32, integral with the bushing. Instead of a screw-plug for closing the opening to the lubricating-chamber of the wheel a movable member 33 is provided situated within a sleeve 34, inserted in the opening and automatically held in coöperation with the opening by a spring 35. This member may be forced in by the spout of the oil-can, and it will reseat itself when this is removed, thus avoiding the necessity of unscrewing or replacing the plug.

Having thus described my invention, I claim as new and desire to secure by Letters Patent—

1. The combination with a rotatable axle, of a wheel rotatable upon the axle, a bushing between the wheel and the axle, and collars on the opposite sides of the wheel, the inner end of said bushing having a flange between the inner collar and the wheel 2. The combination with a hollow rotatable axle having a bearing-surface and with passages leading to the bearing-surface, of a wheel rotatable upon the axle, collars on the opposite sides of the wheel and secured to the axle, and a bushing between the wheel and the axle and having a flange at its inner end between the collar and the wheel, said bushing having passages registering with the passages of the axle.

In testimony whereof I have signed my name to this specification in the presence of two subscribing witnesses.

THOMAS EDWARD LAMBERT.

Witnesses:
  JOHN N. KIRK,
  FLORENCE GOGGIN.